Aug. 28, 1945.  W. W. SCHULZ  2,383,824
COMBINATION FLUID AND FRICTION CLUTCH
Filed June 5, 1943  2 Sheets-Sheet 1

Inventor
Waldemar W. Schulz

Aug. 28, 1945.  W. W. SCHULZ  2,383,824
COMBINATION FLUID AND FRICTION CLUTCH
Filed June 5, 1943  2 Sheets-Sheet 2

Inventor
Waldemar W. Schulz

By Clarence A. O'Brien
and Harvey B. Jacobson
Attorneys

Patented Aug. 28, 1945

2,383,824

UNITED STATES PATENT OFFICE 2,383,824

COMBINATION FLUID AND FRICTION CLUTCH

Waldemar W. Schulz, Wells, Minn.

Application June 5, 1943, Serial No. 489,835

1 Claim. (Cl. 192—3.2)

This invention relates to new and useful improvements in clutches for various types of power plants and power transmission and more especially for use in conjunction with motor driven locomotives.

The principal object of the present invention is to provide a combination clutch mechanism which in use will dispense with the use of generators and electric motors in many instances, such as are now required in the transmission of power.

Other objects and advantages of the invention will become apparent to the reader of the following description.

In the drawings:

Figure 4 is a plan view of a special adaptation of the combination clutch.

Figure 1:
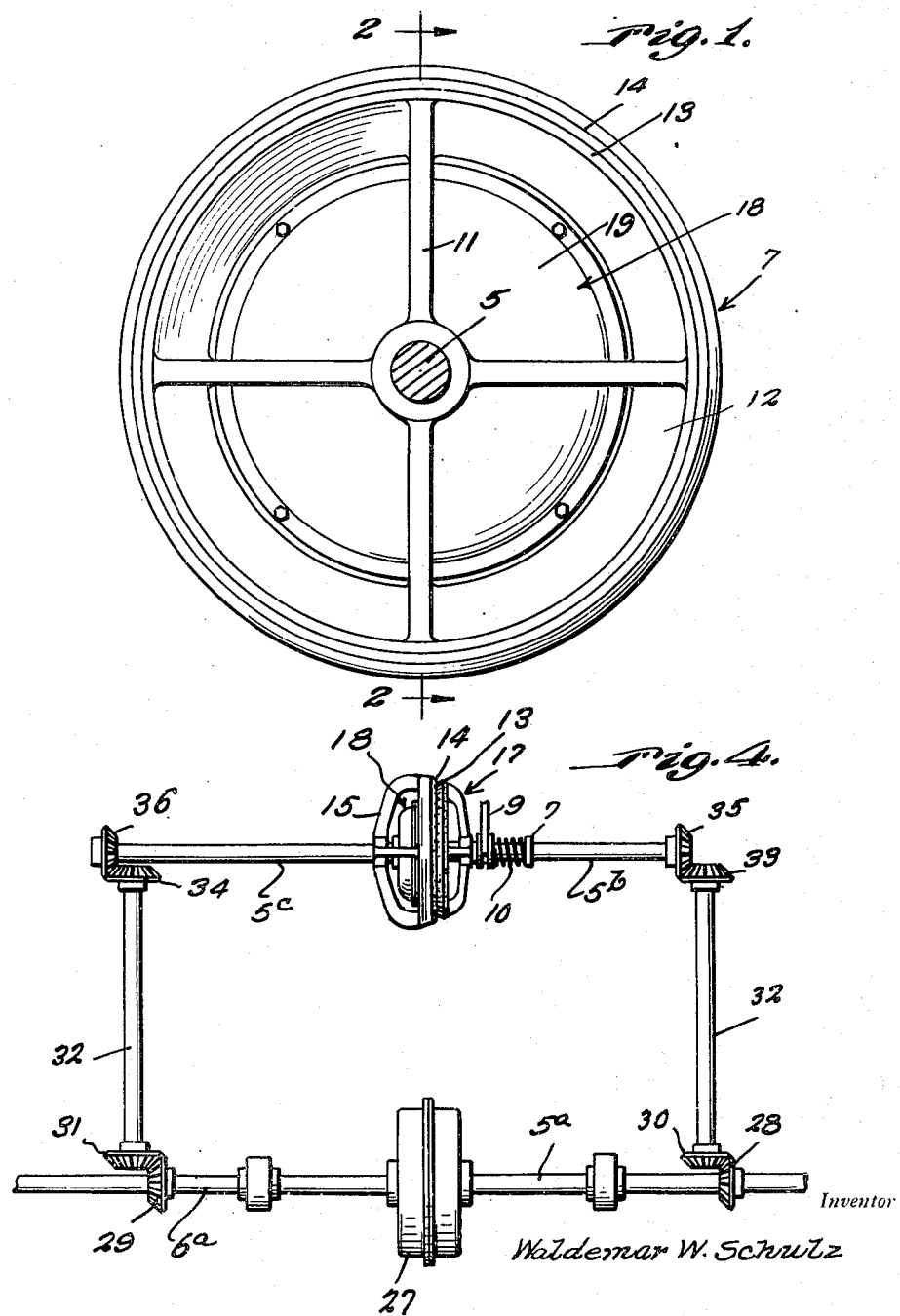
Figure 1 represents a cross sectional view through the drive shaft showing the combination clutch in front elevation.
Figure 2:
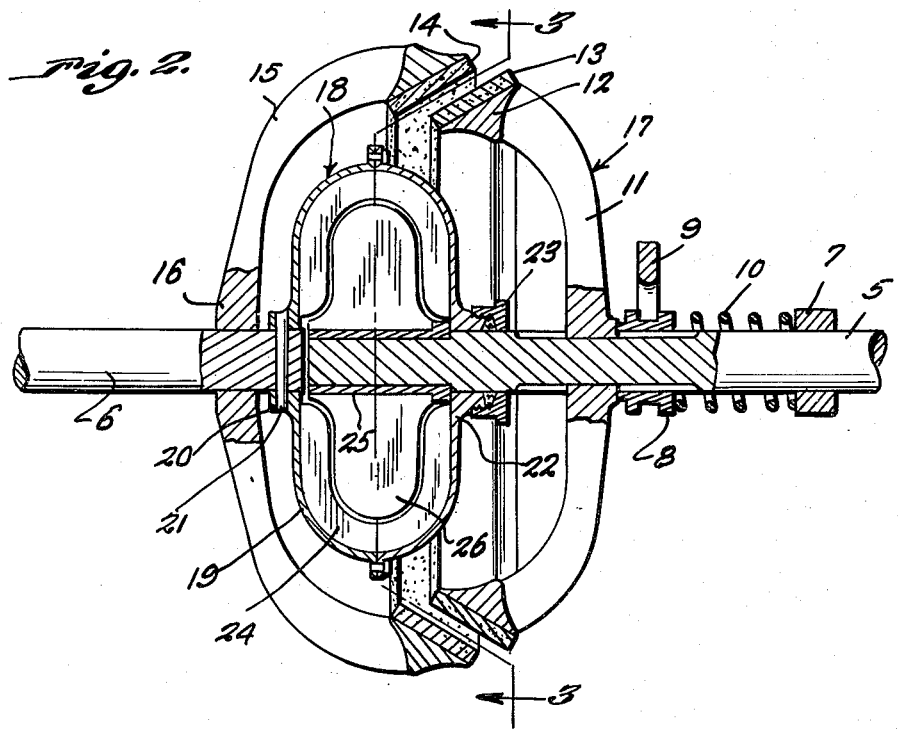
Figure 2 is a vertical section on the line 2—2 of Figure 1.
Figure 3:
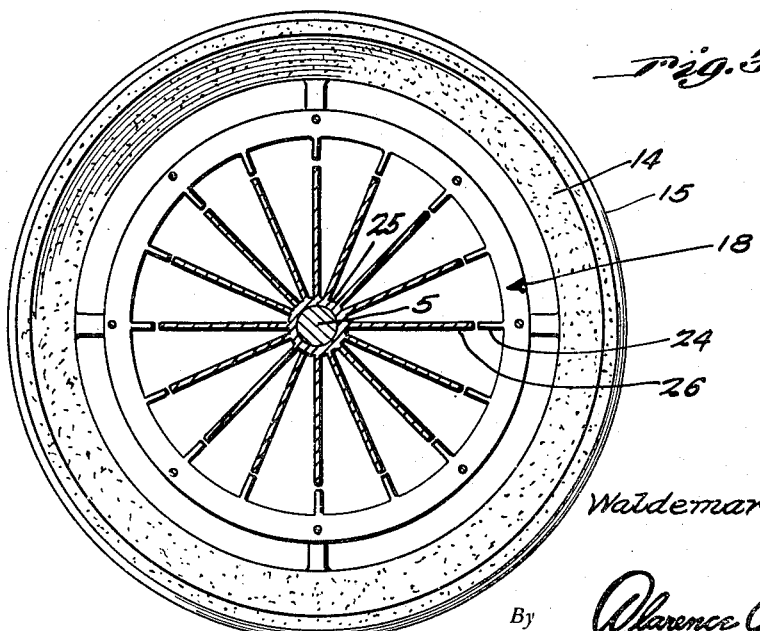
Figure 3 is a section on the line 3—3 of Figure 2.

Referring to the drawings wherein like numerals designate like parts, it can be seen in Figure 2, that the clutch is a combination fluid and friction clutch and that numerals 5, 6 denote drive and driven shafts connected with said combination clutch.

The drive shaft 5 has a stop collar 7 thereon and a slide collar 8 splined to the shaft and having a manually operative yoke 9 whereby said collar 8 can be shifted. A coiled compression spring 10 is interposed between the stop collar 7 and the slide collar 8.

Also splined on the drive shaft 5 and against which the slide collar 8 engages is a spider 11 having curved spokes which at their outer ends connect to an annulus 12 carrying a friction ring 13, opposed to a friction ring 14 carried by a second spider 15 which has curved arms radiating from a fixed hub 16 on the driven shaft 6. As can be seen in Figure 2, the friction rings 13, 14 of the spiders 11, 15 are obliquely set with respect to the longitudinal axis of the shafts 5, 6.

The foregoing structure which is generally referred to by numeral 17 denotes the friction clutch, while numeral 18 denotes the fluid clutch and this will presently be described.

The fluid clutch consists of a sectional housing 19 having a hub 20 at one end which is secured by a pin 21 to the adjacent end of the driven shaft 6. The other section of the housing 19 has a hub 22 which receives the adjacent end of the drive shaft 5, and this hub 22 is properly threaded and otherwise formed to accommodate a packing gland 23. The inside of the housing 19 is provided with inwardly projecting blades 24, the sections of the housing being provided with blades that are aligned, while on the adjacent portion of the drive shaft 5 is a sleeve 25 from which radiate a plurality of paddle-like blades 26 which barely clear the blades 24, but otherwise conform with the shape of the inner edges of the blade 24.

In the operation of the mechanism, after the train is set in motion the fluid clutch 18 would operate until a reasonable speed is reached, when the power plant will be throttled back until both shafts 5, 6 would be revolving at the same speed, at which time the friction clutch would be engaged and there would then be direct drive with very little wear on the friction clutch. The R. P. M. of the two shafts could easily be indicated by installing a tachometer measuring the relative speed of the shafts and giving this reading before the engineer or motorman.

With a sufficiently large fluid clutch, the transmission would not be needed for average starting and would be used only in emergency when exceptional power was needed.

A special adaptation of the clutch is shown in Figure 4. In this instance, the fluid clutch could be geared so that it would take less power to bring the train into motion and could probably be rendered ineffective entirely after the friction clutch was engaged. A tachometer could also be employed with this arrangement.

More specifically, the arrangement shown in Figure 4, shows a drive shaft 5a and a driven shaft 6a interposed between which is a friction clutch 27. The drive and driven shafts have bevel gears 28, 29 thereon meshing with bevel gears 30, 31 which are carried by countershafts 32, 33, which, in turn, have bevel gears 33, 34 meshing with gears 35, 36, respectively on shaft sections 5b, 5c which correspond to the drive and driven shafts 5, 6 in their relationship to the combination fluid and friction clutch, as shown in Figure 2.

While the foregoing specification sets forth the invention in specific terms, it is to be understood that numerous changes in the shape, side and materials may be resorted to without departing from the spirit and scope of the invention as claimed hereinafter.

Having described the invention, what is claimed as new is:

In combination, a pair of complementary shaft ends, a fluid clutch between the shaft ends, and a friction clutch between said shaft ends, said friction clutch consisting of a stationary clutch element and a movable clutch element, said clutch element comprising a pair of spiders including complemental annular friction members oblique transversely to the axis of said shaft ends, said spiders and members enclosing said fluid clutch, and said spiders and friction members being separate from the fluid clutch and forming a cage for the same.

WALDEMAR W. SCHULZ.